INVENTORS
HAROLD L. DUNEGAN
CLEMENT A. TATRO
BY

Lippincott, Ralh & Hendrickson
ATTORNEYS 3,447,378
PEAK PRESSURE MEASUREMENT BY
ACOUSTIC EMISSION
Harold L. Dunegan and Clement A. Tatro,, both of 868
Leland Way, Livermore, Calif. 94550; said Tatro assignor to said Dunegan
Filed Sept. 7, 1967, Ser. No. 666,084
Int. Cl. G01l 7/08
U.S. Cl. 73—396
9 Claims

ABSTRACT OF THE DISCLOSURE

The invention disclosed and claimed herein relates to the determination of maximum pressures by a passive-pressure transducer utilizing acoustic emission of materials. The invention provides for the placement of a solid material such as a diaphragm in a position to experience applied pressure establishing plastic deformation and the subsequent determination of the maximum-applied pressure by determination of reapplied pressure upon such material at which acoustic emission commences.

Background of invention

It has been determined that materials subjected to pressures causing plastic deformation produce acoustic emission. It has furthermore been established that material once subjected to a pressure causing such a deformation does not again produce acoustic emission under pressure until the prior maximum pressure is attained. Experimentation has been made with a wide variety of materials such as metals, glass, wood and the like, and it appears that all such materials exhibit this characteristic. It has been proposed to employ the above-noted characteristic for the testing of materials, and in this respect attention is invited to German Patent No. 852,771 to J. Kaiser. The effect, described briefly above, is, in fact, sometimes termed the "Kaiser effect," and, although certain of the conclusions reached by Kaiser in his original work may be open to question, it has been well established by subsequent investigation that the basic premise is correct.

The present invention operates upon the basic principle of acoustic emission of materials undergoing plastic deformation. It is to be realized in this respect that some yielding or deformation of the material is required for acoustic emission to occur, although it has been found that extremely low-level and intermittent emission can be detected for what might be termed "molecular yield" or deformation. A peak in the acoustical energy emission does, however, occur somewhere in the plastic deformation range of each material; thus, the present invention is applicable with materials for forces or pressures sufficient in magnitude and duration to cause some deformation of the material.

Summary of invention

The present invention in brief provides a passive peak-pressure measuring device employing the irreversible acoustic emission effect of materials. More particularly, the invention provides a member, preferably in sheet form, in a constraining unit for positioning in an environment wherein peak pressure is to be monitored or recorded. Following stressing of the material by applied pressures, it is then removed from such environment and subjected to known increasing pressure while being monitored for acoustic emission. Because of the above-noted irreversible acoustic emission effect of materials, there will be produced an acoustic emission at the peak pressure to which the material was previously subjected in the aforementioned environment. This, then, provides an accurate measurement of the peak pressure to which the material had been previously subjected. This invention requires no adjustment or calibration and provides an absolute pressure indication in distinction to conventional peak-pressure measuring devices which commonly employ some type of indirect measurement such as strain or displacement of elements and requiring calibration and close identity between units in order to preclude sizeable errors in pressure readings.

Description of figures

The present invention is illustrated as to particular preferred embodiments thereof in the accompanying figures wherein.

Description of preferred embodiments

Figure 1:
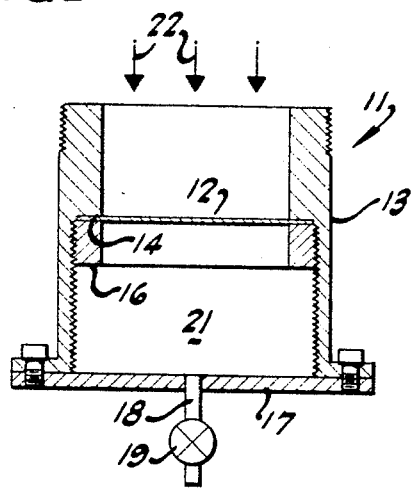
FIGURE 1 is a central sectional view taken through one preferred embodiment of the present invention.

Referring first to FIGURE 1, there will be seen to be illustrated a unit 11 mounting a thin diaphragm 12 in peripherally clamped condition. The unit 11 includes cylindrical housing 13 which may have a shoulder 14 formed internally thereabout and against which the diaphragm 12 may be pressed by a retaining ring 16 threaded internally of the housing. It is, of course, to be appreicated that a wide variety of different diaphragm-clamping means may be employed; the simple one shown is purely for convenience of description. The present invention provides for exposing an element, in this case the diaphragm 12, to varying pressures for the purpose of determining the peak applied pressure. Such peak pressure is intended to plastically deform the pressure-responsive element or diaphragm 12, and this may be conveniently encouraged by evacuation of the housing on one side of the diaphragm. Such is illustrated to be accomplished by means of a cover plate 17 bolted to a flange about the housing and having a vacuum line 18 extending through this plate 17 with a valve 19 on the line. Attachment of a vacuum pump to the line 18 and opening of the valve with the diaphragm firmly held in position within the housing will thus cause an evacuation of the chamber 21 defined within the housing between the diaphragm and end plate 17. The valve 19 is then closed to maintain the vacuum in the housing and the diaphragm is in condition to be exposed to varying pressures as indicated, for example, by the arrows 22 extending through the opposite open end of the housing 13.

The diaphragm 12 may be formed of a wide variety of materials and of widely varying thicknesses. It is necessary that the diaphragm be able to withstand the peak applied pressure without rupture in order to be useful in the present invention. Thus, with some knowledge of the expected maximum pressure to be measured, the diaphragm material and thickness may be readily chosen. One advantageous diaphragm material is anodized 6061-T6 aluminum. The oxydized coating which normally forms on aluminum is advantageous herein inasmuch as a cracking of the coating occurs at lower pressures before actual plastic deformation of the aluminum itself, consequently readings can be obtained over a very substantial pressure range. One particular diaphragm of the above-noted aluminum was formed of the thickness 0.05" and found to give a working range of 2000 to 5000 p.s.i. Naturally a thicker diaphragm may be employed for higher pressures and a thinner diaphragm for lower pressures.

Figure 2:
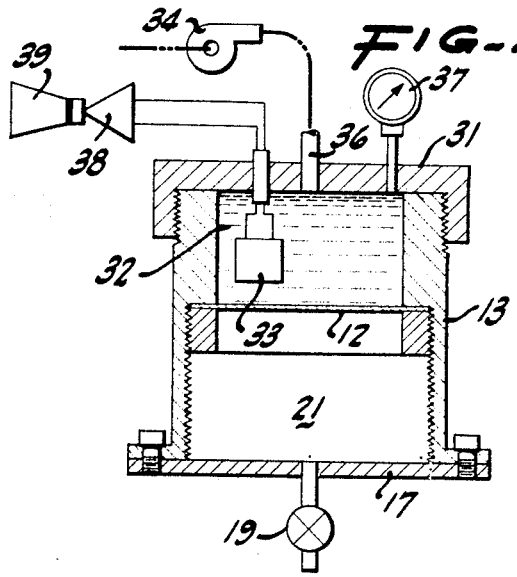
FIGURE 2 is a central sectional view taken through the same embodiment of the present invention as illustrated in FIGURE 1 and including pressure-recreating means and acoustic monitoring.

A further portion of the present invention is an acoustic detector and means for repressurizing the diaphragm 12. These additional means are illustrated in FIGURE 2 as being incorporated in a cap 31 which is shown to be threaded into closing relationship with the open end of the housing 13 above the diaphragm. A liquid 32, such as water, may be disposed above the diaphragm to maximize transmittal of acoustic energy. A transducer such as a piezoelectric crystal 33 is disposed adjacent the diaphragm to monitor acoustic emission, and means such as a pump 34 is provided for increasing the pressure above the diaphragm by an inlet pipe 36 through the cap 31. A pressure gauge 37 is shown to communicate with the volume above the diaphragm through the cap 31. In most simple form the invention operates to produce an electrical signal from the piezoelectric crystal 33 upon the initiation of acoustic emission from the diaphragm as pressure is increased on such diaphragm. The crystal 33 is preferably well coupled to the diaphragm as by means of the liquid 32, and, again in most simple form, the output of this crystal may be applied to an amplifier 38 that, in turn, drives a speaker, or the like, 39.

In determining the peak pressure to which the diaphragm 12 has previously been exposed the cap 31 is affixed to the housing and pressure above the diaphgram is gradually increased by the pump 34 with the gauge 37 at all times indicating the actual pressure applied to the diaphragm. Substantially no acoustic emission will occur until the pressure on the diaphragm reaches the previous maximum pressure applied thereto. When the reapplied pressures reaches the peak pressure to which the diaphragm has previously been exposed, there will be emitted acoustic energy from the diaphragm and this will actuate the crystal 33 so that in the illustrated embodiment an audio signal is produced. The pressure, as read by the gauge 37, at which this audio signal is produced is equal to the maximum, or peak, pressure to which the diaphragm was previously subjected. That the foregoing is indeed the case is illustrated in the plot of FIGURE 3 briefly described below.

Figure 3:
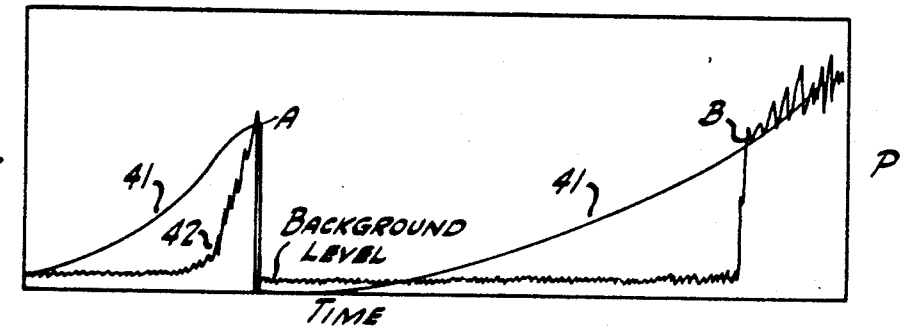
FIGURE 3 is a plot of pressure and acoustic emission versus time illustrating a peak-pressure measurement made with the present invention.

With the apparatus set up as illustrated in FIGURE 2 the pressure on the diaphragm 12 was gradually increased, as indicated by the plot 41 of pressure versus time in FIGURE 3. It will be seen upon reference to FIGURE 3 that acoustic emission 42 increased with increasingly applied pressure during the initial pressure application or first cycle. The curve 42 is a plot of acoustic emission, in this case counts per second versus time. With the release of applied pressure on the diaphragm 12, the acoustic emission fell from a maximum at A to a minimum herein indicated as the background level. In order to test the apparatus the pressure was then again increased gradually, as indicated by the curve 41, as a second cycle of pressure application. It is to be particularly noted that the acoustic emission remained substantially constant at the background level as the reapplied pressure was increased until this second cycle of pressure reached substantially the same peak pressure of the first cycle. At this point the acoustic emission jumped, or rose, rapidly to a high level at B substantially equal to the acoustic emission at the peak pressure of the first cycle. Regardless of the relative amounts of acoustic emission it is noted that a very marked increase in acoustic emission occurred at substantially the same pressure as had been previously applied to the specimen 12 and that for lesser pressures substantially no acoustic emission occurred. Consequently, this establishes the capability of the present invention for use as a passive-pressure transducer for measuring peak pressures. The peak pressure A of the first cycle was, in fact, very clearly identified and established by the substantially instantaneous increase in acoustic emission from an almost zero level to a very substantial level when the reapplied pressure reached this previous peak pressure. Of course, the application of further increasing pressure beyond this point produces additional acoustic emission. The important point, however, is that the maximum peak pressure A of curve 41, i.e., the end of the first cycle of applied pressure, is substantially equal to the pressure at point B of curve 41 during the second cycle of pressure application and as determined by the reestablishment of acoustic emission at such pressure. In this particular test an error of about five percent at peak pressure of somewhat greater than 200 p.s.i. was observed; however, greater accuracy of measurement has been obtained with the present invention, and it is by no means impossible to achieve an accuracy of the order of ninety-seven percent or greater.

With regard to the monitoring of pressure readings, it is normal to employ a somewhat more sophisticated system than that illustrated in FIGURE 2. The measurements plotted in FIGURE 3 were actually made with a system employing a preamplifier receiving the output of the piezoelectric transducer 33 and feeding into a wideband amplifier that in turn fed a variable bandpass filter removing low-frequency laboratory noises and restricting the acoustic energy to a narrow band around that of the peak response of the transducer. The amplified acoustic emission signal A, as then applied to a counter, counted the number of events per unit time and this is plotted as the ordinate in FIGURE 3. In actual practice the counter applied the output to a digital printer and the digital-to-analog output of the printer was employed to display the acoustic emission as a function of pressure on an $xy$ recorder. In this particular experiment the acoustic emissions were limited to a narrow band about one megacycle; however, various other embodiments of the present invention have been operated at a wide variety of different bandpass frequencies such as, for example, sixty kilocycles.

Figure 4:
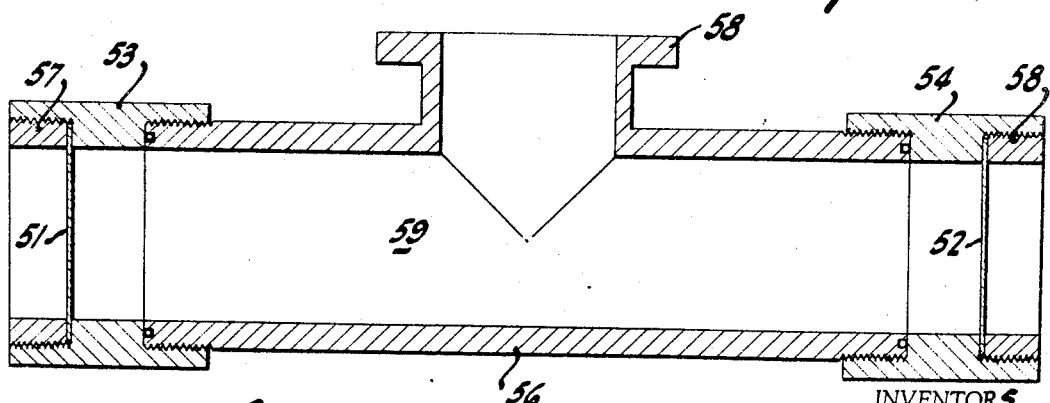
FIGURE 4 is a central longitudinal sectional view through an alternative embodiment of the present invention.

It is to be appreciated that a variety of modifications may be made in the specific structure of the present invention. There is, for example, illustrated in FIGURE 4 an alternative embodiment employing two diaphragms 51 and 52 which will be seen to be seated in cylindrical end units 53 and 54, respectively, that are, in turn, threaded upon a central cylinder 56 and sealed thereto by appropriate O rings or the like. The diaphragms may be firmly anchored to the end units 53 and 54 about the diaphragm edges by restraining rings 57 and 58 or the like. The interior chamber 59 of the cylindrical centerpiece 56 is adapted to be evacuated as through the connection 61. With this connection sealed, the unit may be employed by exposure in an environment wherein a peak pressure is to be determined, so that each of the diaphragms 51 and 52 is stressed by such pressure. The diaphragms may then be removed and pressure reapplied in a unit of the type illustrated in FIGURE 2. Alternatively, it is possible to apply pressure through the connection 61 to the interior of the unit for reapplying pressure up to the prior peak pressure; however, it is to be noted in this respect that in such case there is to be provided a transducer such as a piezoelectric crystal acoustically coupled to the diaphragms, preferably via a liquid placed in chamber 59. It is possible with this particular embodiment of the present invention to measure dynamic pressure such as, for example, a pressure wave approaching the unit from one end thereof wherein the first diaphragm 51 is exposed to the shock wave and the second diaphragm 52 is exposed to the trailing pressure of the wave for particular applications of the invention. Of course, in such circumstances the diaphragms 51 and 52 are to be separately operated upon to determine the peak pressures experienced by each.

There is a large variety of applications of the present invention of which some are probably quite obvious, such as, for example, determination of maximum pressures in sonic booms or air blasts from explosions. The invention is also particularly applicable for "telltale" applications such as, for example, on submarines to record maximum depth reached on a voyage, or at customer's connection points in municipal water systems to record maximum pressure as a protection against damage claims from overpressures. Another, and possibly less obvious application of the present invention, is the detection of peak acceleration experienced in accidents, or the like, in automobiles and airplanes, for example. By providing a liquid in the chamber 21 of the embodiment of FIGURE 1, for example, and aligning the unit with the direction of motion of a vehicle, the diaphragm 12 will experience a pressure from such liquid proportional to acceleration or deceleration causing the liquid to be urged against the diaphragm. The subsequently determined peak pressure experienced by the diaphragm may then be related back to peak acceleration or deceleration of the unit. Various other applications of the present invention are also available, and the invention does lend itself to a variety of uses while at the same time obviating certain prior art problems of calibration and complexity.

Although the present invention has been described with respect to particular preferred embodiments, it is not intended to limit the invention to the terms of the description and precise details of illustration.

That which is claimed is:
1. A passive peak-pressure-determining device comprising:
   (a) at least one element having a pressure range for plastic deformation encompassing a peak pressure to be determined,
   (b) means firmly clamping said element in fixed relation to a unit adapted to be positioned for experiencing a peak pressure to be determined,
   (c) means for gradually reapplying an increasing pressure to said element following exposure thereof to a peak pressure,
   (d) means monitoring acoustic emission from said element under increasing reapplied pressure, and
   (e) means indicating the pressure at which acoustic emission commences under increasing reapplied pressure as the peak pressure to which said element was previously subjected.

2. The device of claim 1 further defined by said element having the shape of a diaphragm.

3. The device of claim 2 further defined by said diaphragm being composed of thin aluminum.

4. The device of claim 2 further defined by said means clamping the element comprising an open-ended housing and having means circumferentially clamping said diaphragm in removable position therein across said opening within said housing.

5. The device of claim 4 further defined by said housing comprising a chamber closed by said diaphragm, and said chamber being evacuated.

6. The device of claim 4 further defined by a cover removably sealing said open housing end for disposition thereon following exposure of the diaphragm to a peak pressure to form a chamber with said diaphragm and housing, a liquid disposed within said chamber and the means monitoring acoustic emission comprising a detector located in said chamber for producing a signal from acoustic emission by said diaphragm.

7. The device of claim 1 further defined by said means monitoring said gradually increasing reapplied pressure comprising a transducer removably disposed adjacent said element and means acoustically coupling said transducer and element.

8. The device of claim 1 further defined by there being two of the elements of clause (a), the means of clause (b) clamping said elements in back-to-back separated disposition with outside faces thereof only being exposed and the means of (c), (d) and (e) being separately operable upon each element.

9. A method of measuring peak pressure comprising the steps of:
   (a) exposing an element to a peak pressure to be determined while firmly holding the element so that the element is deformed without rupture by such pressure,
   (b) applying a gradually increasing pressure to the element,
   (c) monitoring acoustic emission from the element undergoing increasing pressure while monitoring such pressure, and
   (d) indicating the pressure at which acoustic emission occurs as the peak pressure previously experienced by the element.

References Cited

UNITED STATES PATENTS 3,345,876   10/1967   Smith _____ 73—388

FOREIGN PATENTS 852,771   10/1952   Germany.

LOUIS R. PRINCE, *Primary Examiner.*
D. O. WOODIEL, *Assistant Examiner.*

U.S. Cl. X.R.
73—35, 406